US008051198B2

(12) United States Patent
Sudo

(10) Patent No.: US 8,051,198 B2
(45) Date of Patent: Nov. 1, 2011

(54) COMMUNICATION SYSTEM AND COMMUNICATION METHOD

(75) Inventor: Hiroaki Sudo, Yokohama (JP)

(73) Assignee: Panasonic Corporation, Osaka (JP)

( * ) Notice: Subject to any disclaimer, the term of this patent is extended or adjusted under 35 U.S.C. 154(b) by 352 days.

(21) Appl. No.: 10/542,657

(22) PCT Filed: Nov. 24, 2004

(86) PCT No.: PCT/JP2004/017407
§ 371 (c)(1),
(2), (4) Date: Jul. 19, 2005

(87) PCT Pub. No.: WO2005/053249
PCT Pub. Date: Jun. 9, 2005

(65) Prior Publication Data
US 2006/0117111 A1   Jun. 1, 2006

(30) Foreign Application Priority Data
Nov. 28, 2003   (JP) .................................. 2003-400347

(51) Int. Cl.
*G06F 15/16* (2006.01)
(52) U.S. Cl. ......... 709/237; 455/440; 709/238; 370/332
(58) Field of Classification Search .......... 709/234–238; 455/439–444; 370/228–332, 338
See application file for complete search history.

(56) References Cited

U.S. PATENT DOCUMENTS

| | | | | |
|---|---|---|---|---|
| 6,061,650 A | * | 5/2000 | Malkin et al. | 704/228 |
| 6,091,952 A | * | 7/2000 | Xu et al. | 455/433 |
| 6,151,628 A | * | 11/2000 | Xu et al. | 709/225 |
| 6,400,304 B1 | * | 6/2002 | Chubbs, III | 342/20 |
| 6,421,714 B1 | * | 7/2002 | Rai et al. | 709/217 |
| 6,647,264 B1 | * | 11/2003 | Sasamoto | 455/445 |
| 6,947,401 B2 | * | 9/2005 | El-Malki et al. | 370/331 |
| 7,269,425 B2 | * | 9/2007 | Valko et al. | 455/456.1 |

(Continued)

FOREIGN PATENT DOCUMENTS
JP   11261623   9/1999
(Continued)

OTHER PUBLICATIONS

Vivaldi, Habaebi, Ali, Prakesh, "Fast handover algorithm for hierarchical mobile IPv6 macro-mobility Management", Sep. 2003, IEEE Communications, 2003, APCC, 2003, vol. 2, 1(630)-5(634).*

(Continued)

*Primary Examiner* — Djenane Bayard
*Assistant Examiner* — Ninos Donabed
(74) *Attorney, Agent, or Firm* — Dickinson Wright PLLC

(57) ABSTRACT

A communication system enabling significant reduction in delay in handover between MAPs without increasing the number of MAPs to install. In the communication system, MAP(101) issues a Router Advertisement to AR(111) to AR(118). Particularly, MAP(101) assigns a plurality of Router Advertisements of a source of care-of address (RCOA) to register with HA to AR(118) of a cell on either side of a boundary of areas for each MAP. MN(107) receives a Router Advertisement transmitted from AR that is a communicating party among AR(119) to AR(126), and using the Router Advertisement, generates care-of addresses, RCOA and LCOA. AR(111) to AR(118) transmit the Router Advertisement RA generated by MAP(101) to MN in communication. Further, AR(111) to AR(118) transmit the care-or-addresses, RCOA and LCOA, issued from MN(107) to MAP (101).

12 Claims, 6 Drawing Sheets

U.S. PATENT DOCUMENTS

| | | | | |
|---|---|---|---|---|
| 7,512,120 | B2* | 3/2009 | Takahashi et al. | 370/354 |
| 2001/0027107 | A1* | 10/2001 | Shinozaki et al. | 455/456 |
| 2002/0199104 | A1* | 12/2002 | Kakemizu et al. | 713/168 |
| 2003/0185196 | A1* | 10/2003 | Venkitaraman | 370/351 |
| 2003/0225892 | A1 | 12/2003 | Takusagawa et al. | |
| 2004/0008664 | A1* | 1/2004 | Takahashi et al. | 370/351 |
| 2004/0024901 | A1* | 2/2004 | Agrawal et al. | 709/238 |
| 2004/0049532 | A1* | 3/2004 | Oka et al. | 709/202 |
| 2004/0072564 | A1* | 4/2004 | Iwahashi et al. | 455/432.1 |
| 2004/0072569 | A1* | 4/2004 | Omae et al. | 455/445 |
| 2004/0105408 | A1* | 6/2004 | Suh et al. | 370/331 |
| 2004/0240414 | A1* | 12/2004 | Fan et al. | 370/332 |
| 2005/0018637 | A1* | 1/2005 | Karoubalis et al. | 370/338 |
| 2005/0120136 | A1* | 6/2005 | Park et al. | 709/242 |

FOREIGN PATENT DOCUMENTS

| | | |
|---|---|---|
| JP | 2004-15143 | 1/2004 |
| JP | 2004-282249 | 10/2004 |
| WO | 03/034683 | 4/2003 |

OTHER PUBLICATIONS

PCT International Search Report dated Mar. 15, 2005.

K. Keita et al.; "A study on Estimation of Mobility of terminals for Distributed IP Mobility Management in Multilevel Hierachical," Technical Report of IEICE CQ2002-77, Sep. 12, 2002.

IEEE Communications Magazine, 50th Anniversary Commemorative Issue, May 2002, pp. 2-4.

International Search Report dated Mar. 15, 2005.

Hesham Soliman et al., Hierarchial Mobile IPv6 mobility management (HMIPv6), Internet-Draft <draft-ietf-mobileip-hmipv6-08.txt> Jun. 2003, pp. 1-30.

Rajeev Koodli et al., "Fast Handovers for Mobile IPv6," Internet-Draft <draft-ietf-mobileip-fase-mipv6-08.txt> Oct. 2003, pp. i-36.

Taewan You et al., "Robust Hierarchical Mobile IPv6 (RH-MIPv6)," IEEE VTC2003-Fall, Oct. 2003, pp. 2014-2018.

Keita Kawano et, al., "A Multilevel Hierarchical Distributed IP Mobility Management Scheme for Wide Area Networks," 11th International Conference on Computer Communications and Networks, Oct. 2002, pp. 480-484.

Keita Kawano et, al., "A Study on Estimation of Mobility of Terminals for Distributed IP Mobility Management in Multilevel Hierarchy," Technical Report of IEICE CQ2002-77, Sep. 2002, pp. 1-6.

Charles E. Perkins, "Mobile IP," IEEE Communications Magazine, May 2002, pp. 66-82.

European Search Report dated Apr. 15, 2011.

* cited by examiner

COMMUNICATION SYSTEM AND COMMUNICATION METHOD

TECHNICAL FIELD

The present invention relates to a communication system and communication method in the case of using Mobile IP (Internet Protocol) as a communication protocol and further using Mobility Anchor Points.

BACKGROUND ART

Recently, Mobile IP has increasingly been studied in mobile communications (for example, Non-patent Document 1).

Mobile IP is a protocol for automatically detecting a migration of a terminal between networks and enabling communications in a network after the migration in the same way as in a network before the migration. Mobile IP compensates for migrations in IP level, and has characteristics that the IP is not dependent on an application to use and techniques under layer 2.

The schematic operation of Mobile IP will be described below. FIGS. 1A and 1B are schematic diagrams illustrating Mobile IP, where FIG. 1A is a schematic diagram illustrating Mobile Ipv4, and FIG. 1B is a schematic diagram illustrating Mobile Ipv6.

As shown in FIG. 1A, procedures for registering a care-of address in Mobile Ipv4 are as follows: 1. A terminal moves to a cell (step ST11). 2. The terminal receives an Agent Advertisement periodically transmitted from a FA (Foreign Agent) (step ST12). 3. The terminal acquires a care-of address from the Agent Advertisement. 4. The terminal registers the care-of address with the FA (step ST13). 5. The FA registers the care-of address with a Home Agent (step ST14).

The FA is not necessary in Mobile Ipv6. Therefore, the use of Mobile Ipv6 has been discussed widely. Each terminal has a unique address called the home address, and uses a care-of address in a migration place. Accordingly, each terminal is assigned a care-of address as well as the home address. Each terminal needs to register the care-of address with the Home Agent when migrating to another cell. As shown in FIG. 1B, the registration of a care-of address is carried out in following procedures: 1. A terminal moves to another cell (step ST21). 2. The terminal receives a Router Advertisement periodically transmitted from an Access Router (step ST22). 3. The terminal generates a care-of address from the Router Advertisement. 4. The terminal registers the care-of address with the Home Agent (step ST23).

There is a method of installing a Mobility Anchor Point (hereinafter abbreviated as "MAP") on an upper layer of a plurality of Access Routers (hereinafter abbreviated as "ARs") to cause hierarchical registration of care-of address, and thereby intending fast handover and reduction in load on the Home Agent (herein after abbreviated as "HA"). FIG. 2 is a diagram illustrating a configuration of a mobile IP network using MAPs.

A Mobile Node (hereinafter abbreviated as "MN") needs to register a care-of address with the MAP as well as the HA. The MN detects Prefixes of the MAP and AR from the Router Advertisement (hereinafter abbreviated as "RA") transmitted from the AR, and using the Prefixes and an Interface Identifier of the MN, generates two care-of addresses, a Regional Care-Of Address (hereinafter abbreviated as "RCOA") and On-Link Care-Of Address (hereinafter abbreviated as "LCOA"). Only the RCOA needs to be registered with the HA, and the number of registrations with the HA is significantly reduced. When moving between ARs, a change in LCOA is required, but only registration with the MAP is necessary. Since the MAP exists relatively nearer than the HA, registration time is short, enabling fast handover. In FIG. 2, AR1 to AR8 use the same LCOA, while AR9 to AR16 use the same LCOA.

The aforementioned operation is shown in FIG. 3. FIG. 3 is a flow diagram illustrating an example of the operation in the conventional network.

Initial setting is performed in ST51. In ST52, it is determined whether a terminal has moved between MAPs. When the terminal has moved between MAPs, the processing flow proceeds to ST53. When the terminal has not moved between MAPs, the processing flow proceeds to ST54. In ST53, the RCOA is registered with the HA. In ST54, the LCOA is registered with the MAP, and the processing flow returns to ST52. A list of terms of Mobile IP is shown in Table 1.

[Table 1]

However, in the aforementioned constitution using MAPs, it is necessary to register the care-of address with both the MAP and HA in handover between MAPs. It is thus an issue to reduce delay time in handover between MAPs.

In order to overcome the aforementioned issue, i.e. to reduce the delay time in handover between MAPs, a method is considered for installing MAPs hierarchically (for example, Non-patent Document 2).
Non-patent Document 1: Charles E. Perkins, "Mobile IP", IEICE Communications Magazines, MAY 2002,
Non-patent Document 2: Kono, et al., "Study on Terminal Mobility Analogy Method for Multilayer Dispersive IP Mobility Control System, CQ2002-77.

DISCLOSURE OF INVENTION

Problems to be Solved by the Invention

However, in the conventional apparatus, such a problem exists that the number of MAPs becomes extremely large in the case of hierarchically setting the MAPs to reduce the delay time in handover between MAPs caused by registrations of a care-of address with both the MAP and HA in the handover between MAPs.

It is an object of the present invention to provide a communication system and communication method enabling significant reduction in delay in handover between MAPs without increasing the number of MAPs to install.

Means for Solving the Problem

A communication system of the invention adopts a constitution provided with a mobility anchor point which is connected to a plurality of access routers, and issues a care-of address to a communication terminal apparatus communicating with one of the access routers, the access routers one of which is communicating with the communication terminal apparatus and transmits the care-of address to the communication terminal apparatus, a network which connects the mobility anchor point and the access routers and transmits the care-of address to a home agent to which the communication terminal apparatus belongs, and the home agent which stores the care-of address and a home address in association with each other for each communication terminal apparatus, and transmits data that is transmitted to the home address of the communication terminal apparatus to a destination indicated by the care-of address, where the mobility anchor point issues another care-of address effective in a cell of an access router and in another cell to the communication terminal apparatus communicating with the access router with the cell being adjacent to the another cell that belongs to another mobility anchor point.

In a communication method of the invention, in a communication system provided with a mobility anchor point which is connected to a plurality of access routers, and issues a care-of address to a communication terminal apparatus communicating with one of the access routers, the access routers one of which is communicating with the communication terminal apparatus and transmits the care-of address to the communication terminal apparatus, a network which connects the mobility anchor point and the access routers and transmits the care-of address to a home agent to which the communication terminal apparatus belongs, and the home agent which stores the care-of address and a home address in association with each other for each communication terminal apparatus, and transmits data that is transmitted to the home address of the communication terminal apparatus to a destination indicated by the care-of address, another care-of address effective in a cell of an access router and in another cell is transmitted to the communication terminal apparatus communicating with the access router where the cell is adjacent to the another cell that belongs to another mobility anchor point.

Advantageous Effects of the Invention

According to the present invention, in communications using Mobile IP as a communication protocol and further using MAPs, by assigning one more care-of address to register with a Home Agent to cells on either side of the boundary of MAPs, it is possible to significantly reduce delay in handover between the MAPs without increasing the number of MAPs to install.

BEST MODE FOR CARRYING OUT THE INVENTION

The inventor of the invention has noted that since it is necessary to register the care-of address with both the MAP and HA in handover between MAPs, the delay time increases in the handover between MAPs, and that when MAPs are installed hierarchically to reduce the delay time in handover between MAPs, the number of MAPs to install remarkably increases, and reached the invention.

In other words, it is a gist of the invention assigning one more care-of address to register with a Home Agent to cells on either side of the boundary of Mobility Anchor Points in communications using Mobile IP as a communication protocol and further using MAPs, and thereby overcoming the above-mentioned problem.

Embodiments of the present invention will specifically be described below with reference to accompanying drawings.

Embodiment 1

It is a feature of Embodiment 1 of the invention assigning one more care-of address to register with a Home Agent to cells on either side of the boundary of Mobility Anchor Points in communications using Mobile IP as a communication protocol and further using MAPs, and thereby largely reducing delay in handover between MAPs, without increasing the number of MAPs to install.

Figure 1A:
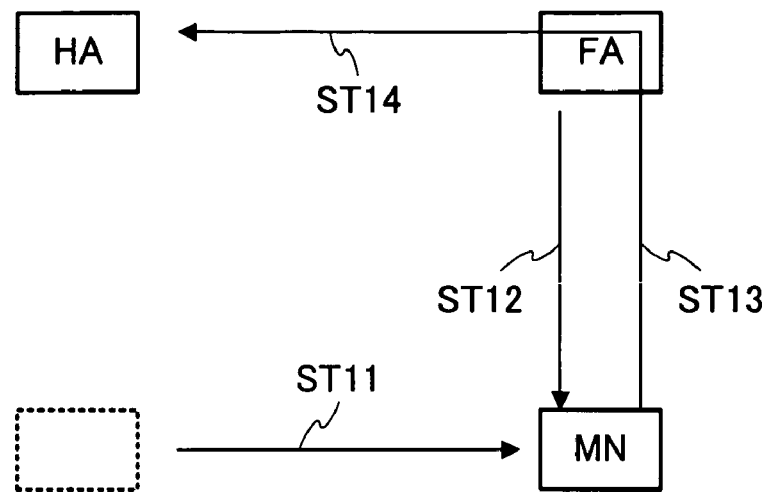
FIG. 1A is a schematic diagram illustrating Mobile IP.
Figure 1B:
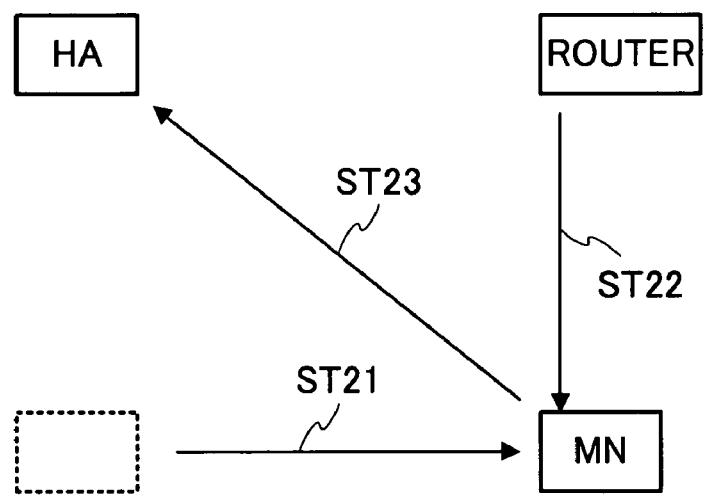
FIG. 1B is a schematic diagram illustrating another Mobile IP.
Figure 2:
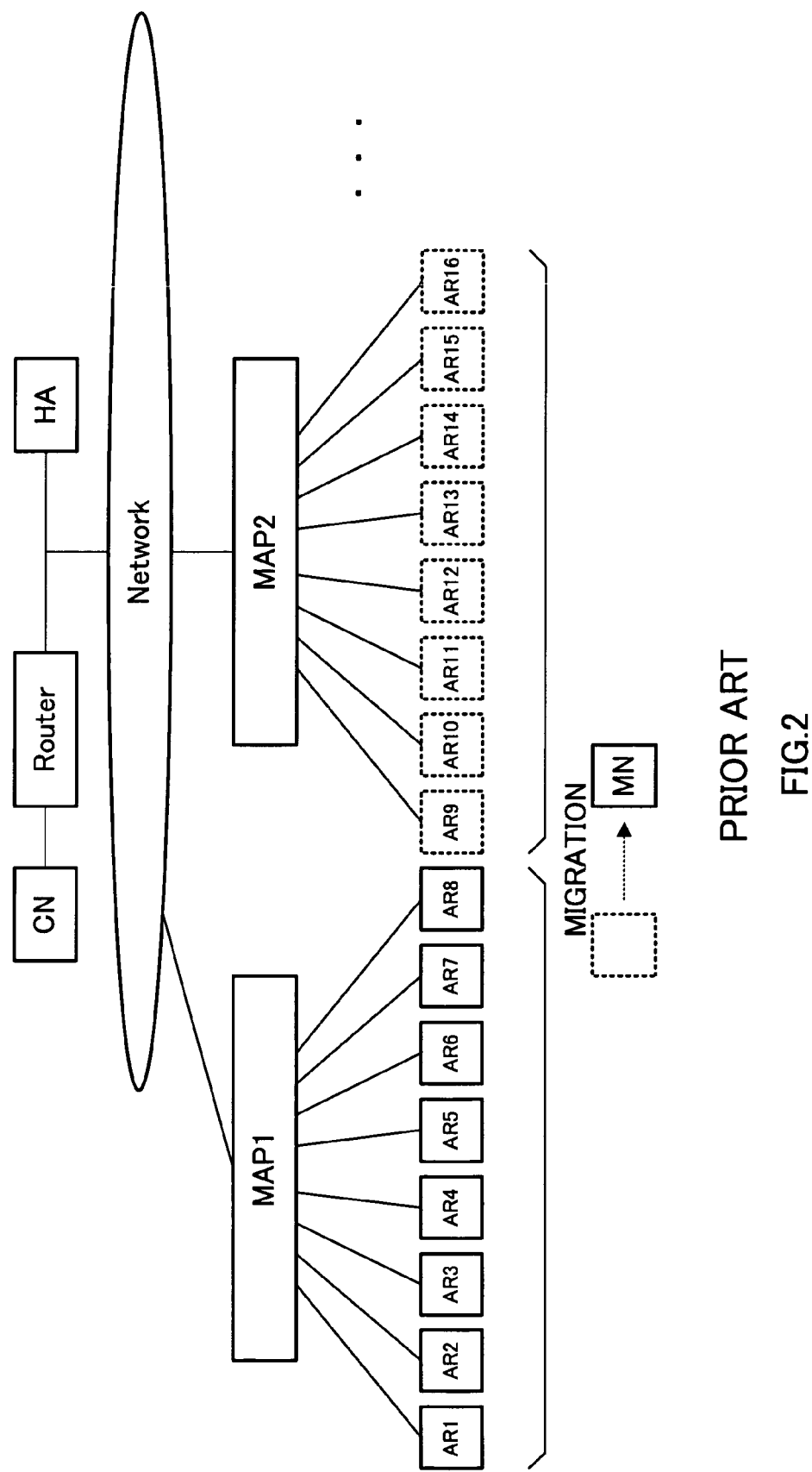
FIG. 2 is a diagram illustrating a configuration of a Mobile IP network using MAPs.
Figure 3:
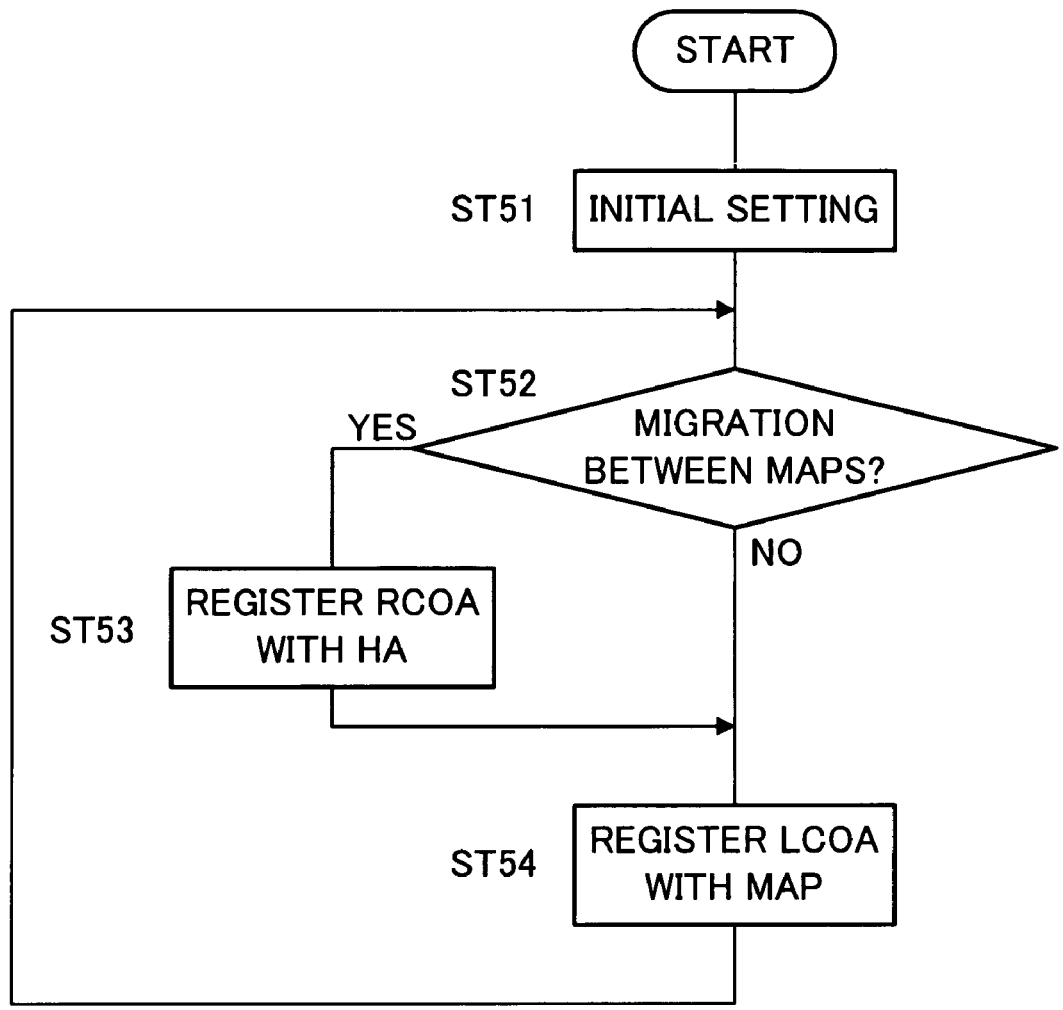
FIG. 3 is a flow diagram illustrating an example of operation in a conventional network.
Figure 4:
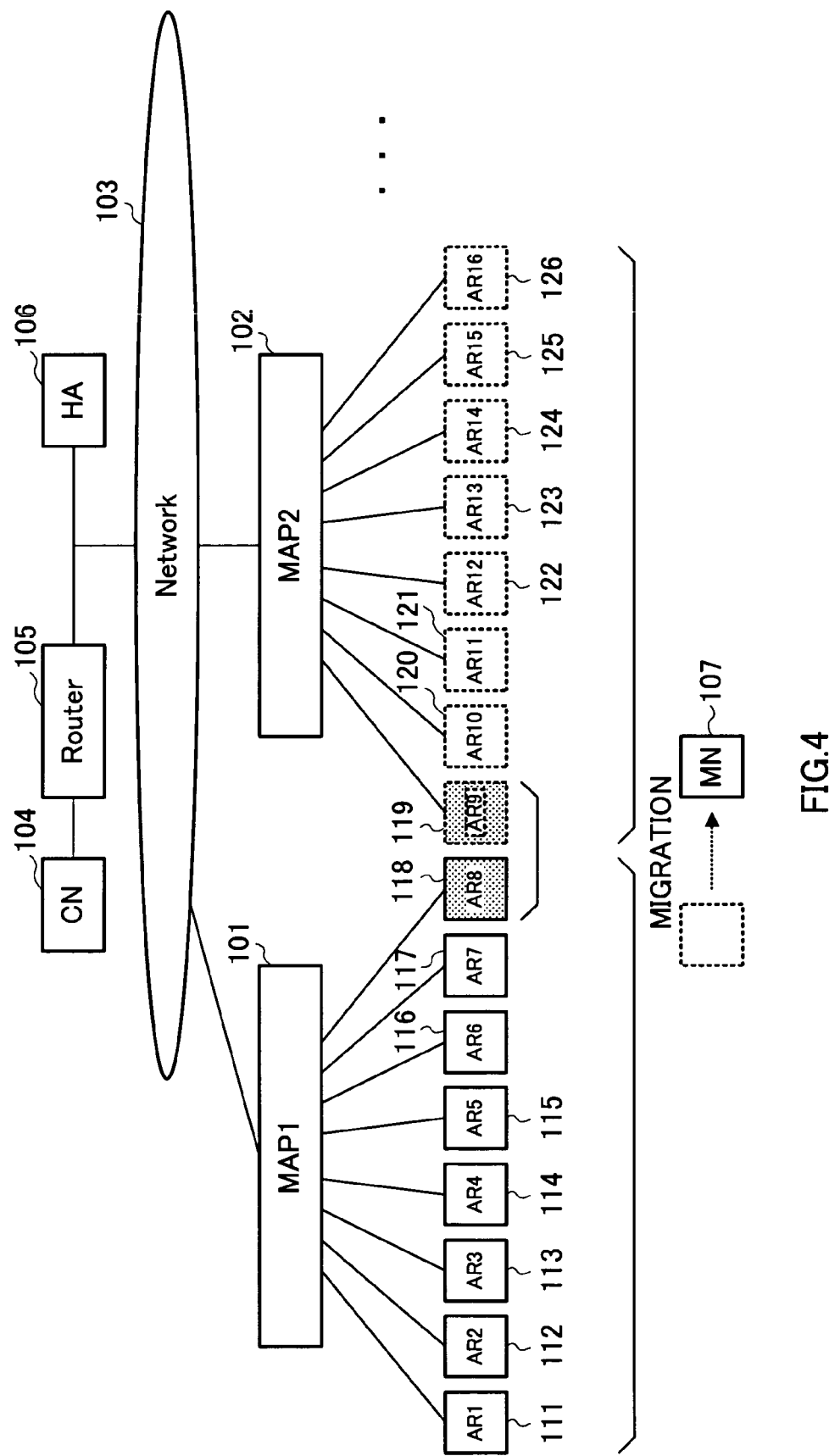
FIG. 4 is a block diagram illustrating a configuration of a communication system according to Embodiment 1 of the invention.

Embodiment 1 will be described below. FIG. 4 is a block diagram illustrating a configuration of a communication system according to Embodiment 1 of the invention. The system of FIG. 4 is principally comprised of MAP 101, MAP 102, network 103, CN 104, HA 106, MN 107 and ARs 111 to 126.

In FIG. 4, MAP 101 issues a Router Advertisement to ARs 111 to 118. Particularly, MAP 101 assigns a plurality of Router Advertisements that are a source of a care-of address (RCOA) to register with the HA to AR 118 of a cell on either side of the boundary of areas for each MAP.

Similarly, MAP 102 issues a care-of address to ARs 119 to 126. Particularly, MAP 102 assigns a plurality of Router Advertisements that are a source of care-of address (RCOA) to register with HA to AR 119 of a cell on either side of the boundary of areas for each MAP. By this means, ARs 111 to 118 use the same care-of address (RCOA), and ARs 119 to 126 use the same care-of address (RCOA).

In other words, two care-of addresses (RCOAs) to register with the Home Agent are assigned to cells (ARs 118 and 119) on either side of the boundary of Mobility Anchor Points.

Network 103 is a network to connect to MAP 101, MAP 102, Router 105 and HA 106. CN 104 is a communicating party that communicates with MN 107 via Network 103. Router 105 transmits a packet to CN 104 among received packets to CN 104.

HA 106 stores the RCOA of MN 107, and delivers a packet to MN 107 to the RCOA.

MN 107 receives a Router Advertisement transmitted from an AR that is a communicating party among ARs 119 to 126, and generates care-of addresses, RCOA and LCOA, from the Router Advertisement. More specifically, MN 107 detects Prefixes of the MAP and AR from the RA, and generates two care-of addresses, RCOA and LCOA of the MN 107. Then, MN 107 transmits the generated RCOA and LCOA to HA 106 via the AR of communicating party and the MAP to which the AR belongs.

ARs 111 to 118 transmit a Router Advertisement generated by MAP 101 to a MN (for example, MN 107) in communication. ARs 111 to 118 further transmit RCOA and LCOA issued from MN 107 to MAP 101.

Similarly, ARs 119 to 126 transmit a Router Advertisement generated by MAP 102 to a MN in communication. ARs 119 to 126 further transmit RCOA and LCOA issued from MN 107 to MAP 102.

In Embodiment 1 of the invention, for example, as shown in FIG. 4, one more care-of address (RCOA) to register with the Home Agent is assigned to cells (ARs 8 and 9 in FIG. 4) on either side of the boundary of Mobility Anchor Points.

Figure 5:
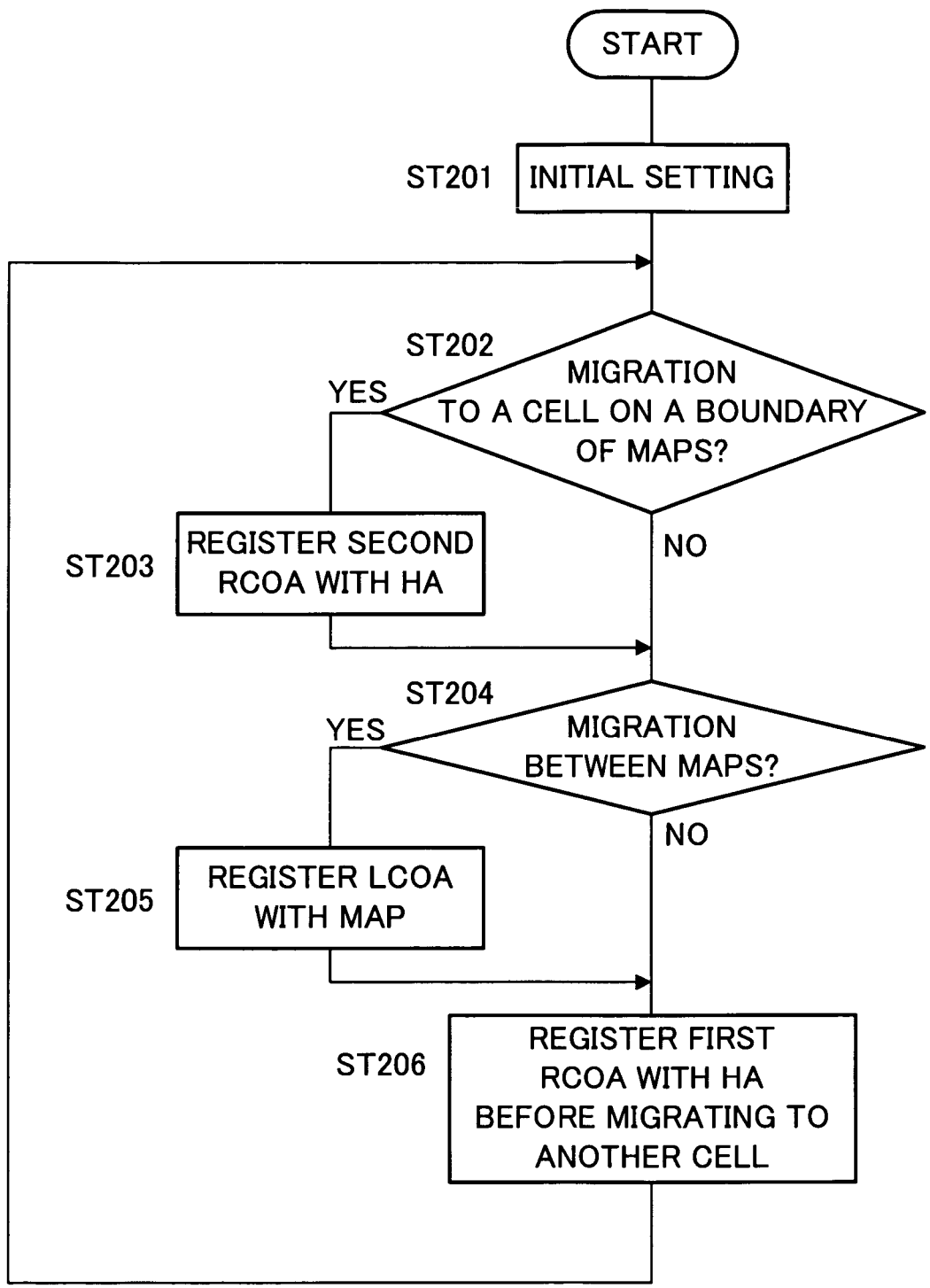
FIG. 5 is a flow diagram illustrating an example of operation in the communication system of this Embodiment.

The operation of the system with the aforementioned constitution will be described below. FIG. 5 is a flow diagram illustrating an example of the operation in the communication system of this Embodiment.

In the present invention, following processing is carried out in the case of performing handover between MAPs.

Initial setting is performed in ST201.

In ST202, it is determined whether a terminal (for example, NN 107 in FIG. 4) has moved to a cell on either side of the boundary of MAPs (for example, a cell of AR 118 in FIG. 4). When the terminal has moved to the cell on either side of the boundary of MAPs, the processing flow proceeds to ST203. When the terminal has not moved to the cell on either side of the boundary of MAPs, the processing flow proceeds to ST204.

In ST203, another care-of address (RCOA) to beforehand register with the HA is registered with the HA before a migration between MAPs (before moving to AR 9 in FIG. 4). Herein, another RCOA to register with the HA is effective in cells (ARs 118 and 119 in FIG. 4) on either side of the boundary of MAPs. Accordingly, the cells on either side of the boundary of MAPs use the same second RCOA, and thus use two RCOAs.

In ST204, it is determined whether the terminal has completed a migration between MAPs (migration from AR 8 to AR 9 in FIG. 4). When the terminal has completed the migration between MAPs, the processing flow proceeds to ST205. When the terminal has not completed the migration between MAPs, the processing flow proceeds to ST206.

In ST205, the LCOA of AR 119 is registered with the MAP. Herein, another RCOA to register with the HA is already registered with the HA. Accordingly, in ST206, the terminal is only required to register the LCOA of AR 9 with the MAP to be allowed to communicate.

When moving from the cell (AR119 in FIG. 4) adjacent to the boundary of MAPs to another cell, it is necessary to register a first RCOA to register with the HA with the HA. However, it is only required to register the first RCOA with the HA during a period of time of existing in the cell (AR119 in FIG. 4) adjacent to the boundary of MAPs, and therefore, the delay does not increase. Accordingly, even in handover between MAPs, only registering the LCOA with the MAP allows communications, and it is thereby possible to largely reduce the delay in handover between MAPs.

Thus, according to Embodiment 1, in communications using MAPs, another care-of address to register with the HA is assigned to cells on either side of the boundary of MAPs, and it is thereby possible to significantly reduce the delay in handover between the MAPs, without increasing the number of MAPs to install.

In addition, the aforementioned descriptions explain the case where a single cell is effective on either side of the boundary of MAPs to assign another care-of address, but the number of cells effective in the care-of address may be plural. In other words, it is possible to optionally set the number of cells effective in the second care-of address.

Further, described above is the case of registering the second care-of address with the HA, but the present invention is not limited to such a case. For example, it is also possible to install a router on a layer higher than the MAP to manage the second care-of address.

Embodiment 2

When moving speed of a terminal is high, there is a fear that the terminal has moved over the boundary of MAPs before completing registration of another care-of address as described above. Therefore, it is required to increase the number of cells effective in another care-of address to assign to cells on either side of the boundary of MAPs. However, as the number of cells effective in another care-of address increases, the number of cells for the HA to manage increases, and an issue arises that the load required for control becomes heavy.

Then, in Embodiment 2 of the invention, the number of cells is made variable which is effective in another care-of address to assign to cells on either side of the boundary of MAPs, and it is thus intended to implement both reduction in delay in handover between MAPs and easiness in control.

Figure 6:
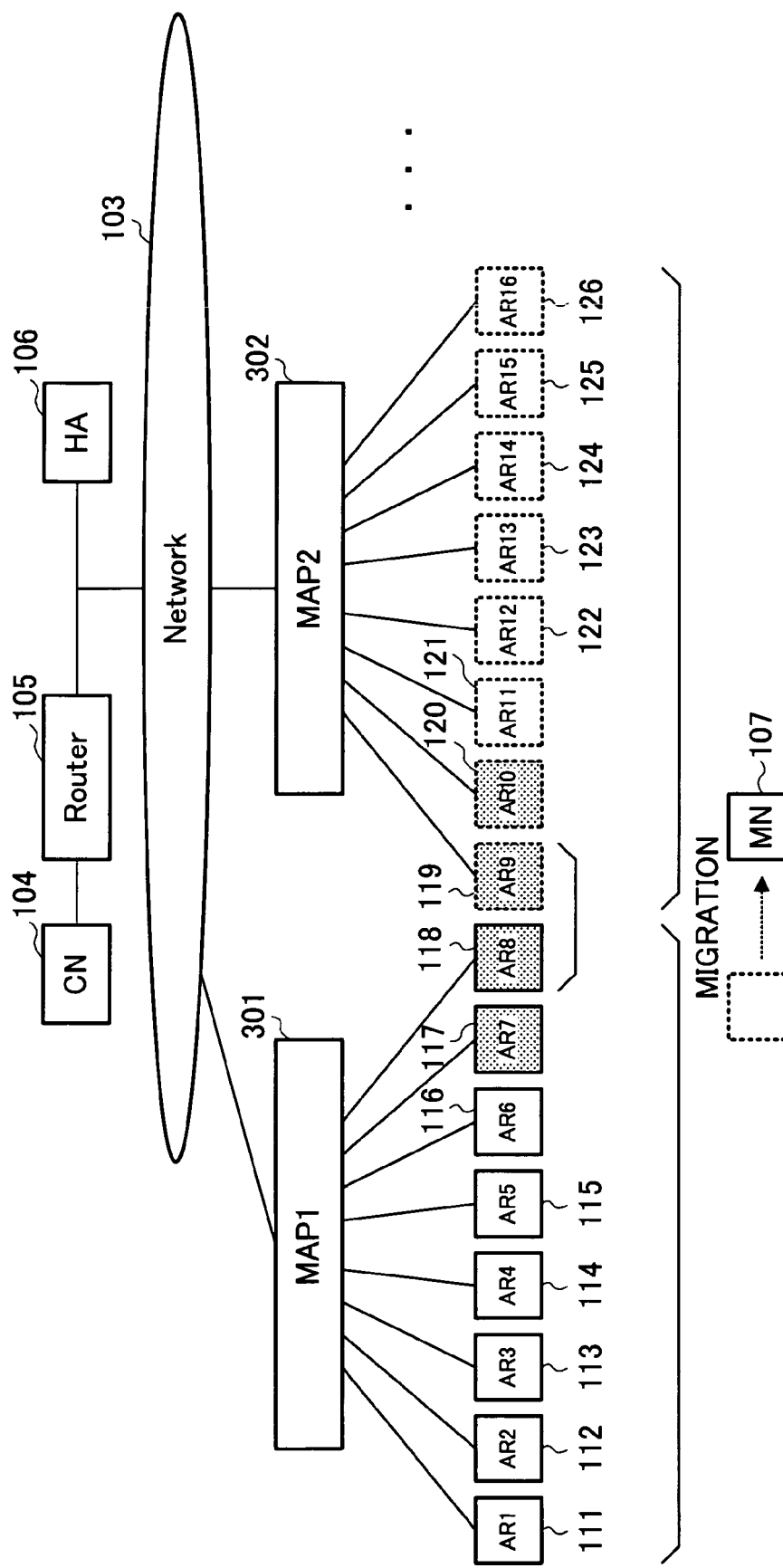
FIG. 6 is a block diagram illustrating a configuration of a communication system according to Embodiment 2 of the invention.

FIG. 6 is a diagram illustrating a configuration of a communication system according to Embodiment 2 of the invention. In addition, the same structural elements as in FIG. 4 are assigned the same reference numerals to omit descriptions thereof.

MAP 301 issues a Router Advertisement to ARs 111 to 118. Then, MAP 301 detects moving speed of a terminal (for example, MN 107), and assigns a plurality of Router Advertisements of a source of care-of address (RCOA) to register with the HA to AR(s) of one or more cells corresponding to the moving speed. In addition, MAP 301 assigns a plurality of Router Advertisements to cells in ascending order of distance from the boundary of MAPs. Further, the number of cells to assign a plurality of advertisements is increased, as the moving speed of a terminal is higher.

Similarly, MAP 302 issues a care-of address to ARs 119 to 126. Then, MAP 302 detects moving speed of a terminal (for example, MN 107), and assigns a plurality of Router Advertisements of a source of care-of address (RCOA) to register with the HA to AR(s) of one or more cells corresponding to the moving speed.

For example, using two kinds of second care-of addresses (care-of address allowing one cell on either side of the boundary to be effective in the care-of address as shown in FIG. 4, and care-of address allowing two cells on either side of the boundary to be effective in the care-of address as shown in FIG. 6), the MAP selects the second care-of address to assign corresponding to the moving speed of the terminal.

In other words, the MAP assigns a care-of address allowing one cell on either side of the boundary to be effective in the care-of address as shown in FIG. 4 when the moving speed of the terminal is low, while assigning another care-of address allowing two cells on either side of the boundary to be effective in the care-of address as shown in FIG. 6 when the moving speed of the terminal is high.

Described herein is the case of using two kinds of second care-of addresses, but the present invention is not limited to such a case. It is also possible to set the arbitrary number of second care-of addresses.

Thus, according to Embodiment 2, by varying the number of cells effective in one more care-of address corresponding to the moving speed of a terminal, it is possible to implement both reduction in delay in handover between MAPs and easiness in control.

In addition, the present invention is not limited to the aforementioned Embodiments, and is capable of being carried into practice with various modifications thereof. For example, the aforementioned Embodiments describe the case of implementing the invention as a communication system, but the invention is not limited to such a case. The communication system may be implemented as software.

For example, it may be possible storing a program to execute the above-mentioned communication method beforehand in ROM (Read Only Memory), and operating the program by a CPU (Central Processor Unit).

Further, it may be possible storing a program to execute the above-mentioned communication method in a computer readable storage medium, further storing the program stored in the storage medium in RAM (Random Access Memory) of a computer, and operating the computer according to the program.

The present application is based on the Japanese Patent Application No. 2003-400347 filed on Nov. 28, 2003, entire content of which is expressly incorporated by reference herein.

INDUSTRIAL APPLICABILITY

The present invention is suitable for use in communications using Mobile IP as a communication protocol.

TABLE 1

| Term | Description | Remarks |
| --- | --- | --- |
| Mobile Node (MN) | Mobile Terminal | |
| Correspond Node (CN) | Communicating party of MN | |
| Home Agent (HA) | Router of Home Network | |
| Foreign Agent (FA) | Router of migration place (except Home Network) | Only Ipv4 |
| Home Address | Fixed address held by MN | |
| Care-Of Address (COA) | Address used in migration place | |
| Access Router (AR) | Router that executes processing for notifying MN of router information (Router Advertisement) (without generating COA) in migration place | |
| Mobility Anchor Point (MAP) | Router on layer higher than AR to control a plurality of ARs hierarchically | |
| Regional Care-Of Address (RCOA) | COA to identify MN in MAP and be notified to HA (enabling its automatic generation from Prefix of MAP) | |
| On-Link Care-of Address (LCOA) | COA to identify MN in network to which AR in communication belongs and be notified only to MAP (enabling its automatic generation from Prefix of AR) | |
| Binding | Correspondence between Home Address and Care-of Address of MN | |
| Binding Update (BU) | Notification to HA of Binding in migration place | |
| Binding Acknowledgement (BA) | Reception ACK in response to Binding Update | |
| Binding Request (BR) | Request for transmission of Binding Update to MN | |
| Gateway GPRS Support Node (GGSN) | Service node defined in GPRS, extension of packet mode of GSM, serving as an external gateway | |
| Serving GPRS Support Node (SGSN) | Service node defined in GPRS, extension of packet mode of GSM, relaying between GGSN and MN | |
| Tunneling | Assigning a header newly and forwarding data | |

The invention claimed is:

1. A communication system comprising:
a communication terminal apparatus comprising a processor;
a plurality of access routers that communicate with the communication terminal apparatus;
a first mobility anchor point that controls an access router subordinate under the first mobility anchor point among the plurality of access routers, issues a first care-of address and a second care-of address, and transmits the issued first care-of address and the issued second care-of address through a network;
a second mobility anchor point that controls another access router subordinate under the second mobility anchor point among the plurality of access routers, wherein the second mobility anchor point is adjacent to the first mobility anchor point and separated by a boundary with the first mobility anchor point; and
a home agent that:
transmits data, transmitted to a home address of the communication terminal apparatus, to a destination indicated by at least one of the first care-of address and the second care-of address, wherein:
the first care-of address can only be used in cells of the first mobility anchor point;
the second care-of address can only be used in predetermined cells;
wherein the predetermined cells:
(i) only include a first cell group, which is part of the cells of the first mobility anchor point, and a second cell group, which is part of the cells of the second mobility anchor point, the second cell group of the second mobility anchor point being adjacent to the first cell group of the first mobility anchor point and separated by the boundary with the first mobility anchor point, and
(ii) do not include at least one of (a) a third cell, which is part of the cells of the first mobility anchor point, and (b) a fourth cell, which is part of the cells of the second mobility anchor point; and
the home agent registers the home address of the communication terminal apparatus, the first care-of address transmitted through the network and the second care-of address transmitted through the network, wherein:
the home address of the communication terminal apparatus, the first care-of address and the second care-of address are associated with each other.

2. The communication system according to claim 1, wherein the first mobility anchor point changes how many cells are to be included in the predetermined cells.

3. The communication system according to claim 2, wherein the first mobility anchor point detects a moving speed of the communication terminal apparatus, and, in a case of communicating with the communication terminal apparatus moving at high speed, sets the predetermined cells to include more cells than in a case of communicating with the communication terminal apparatus moving at low speed.

4. The communication system according to claim 1, wherein the first cell group consists of a first cell of the first mobility anchor point and the second cell group consists of a second cell of the second mobility anchor point.

5. The communication system according to claim 1, wherein the first mobility anchor point that issues the first care-of address and the second care-of address further issues a third care-of address for identifying the communication terminal apparatus in a network of the access router that is subordinate under and communicating with the first mobility anchor point, and registers the third care-of address in the home agent.

6. The communication system according to claim 1, wherein, when the communication terminal apparatus moves from a cell of the second mobility anchor point to a cell of the first mobility anchor point through one or more of the predetermined cells, the first mobility anchor point registers the first care-of address in the home agent while the communication terminal apparatus performs communication using the second care-of address in the one or more of the predetermined cells.

7. A communication method in a communication system comprising a communication terminal apparatus comprising a processor; a plurality of access routers that communicate with the communication terminal apparatus; a first mobility anchor point that controls an access router subordinate under the first mobility anchor point among the plurality of access routers; a second mobility anchor point that controls another access router subordinate under the second mobility anchor point among the plurality of access routers wherein the second mobility anchor point is adjacent to the first mobility anchor point and separated by a boundary with the first mobility anchor point; and a home agent, the communication method comprising:

at the first mobility anchor point, issuing a first care-of address and a second care-of address, and transmitting the issued first care-of address and the issued second care-of address through a network; and at the home agent:
transmitting data, transmitted to a home address of the communication terminal apparatus, to a destination indicated by at least one of the first care-of address and the second care-of address, wherein:

the first care-of address can only be used in cells of the first mobility anchor point;

the second care-of address can only be used in predetermined cells;

wherein the predetermined cells:
i) only include a first cell group, which is part of the cells of the first mobility anchor point, and a second cell group, which is part of the cells of the second mobility anchor point, the second cell group of the second mobility anchor point being adjacent to the first cell group of the first mobility anchor point and separated by the boundary with the first mobility anchor point, and (ii) do not include at least one of (a) a third cell, which is part of the cells of the first mobility anchor point and (b) a fourth cell, which is part of the cells of the second mobility anchor point; and the home agent registers the home address of the communication terminal apparatus, the first care-of address transmitted through the network and the second care-of address transmitted through the network, wherein:

the home address of the communication terminal apparatus, the first care-of address and the second care-of address are associated with each other.

8. The communication method according to claim 7, wherein the first mobility anchor point changes how many cells are to be included in the predetermined cells.

9. The communication method according to claim 8, wherein the first mobility anchor point detects a moving speed of the communication terminal apparatus, and, in a case of communicating with the communication terminal apparatus moving at high speed, sets the predetermined cells to include more cells than in a case of communicating with the communication terminal apparatus moving at low speed.

10. The communication method according to claim 7, wherein the predetermined cells consist of the first cell group of the first mobility anchor point and the second cell group of the second mobility anchor point, and each of the first and second cell groups comprises a plurality of cells.

11. The communication method according to claim 7, wherein the first mobility anchor point that issues the first care-of address and the second care-of address further issues a third care-of address for identifying the communication terminal apparatus in a network of the access router that is subordinate under and communicating with the first mobility anchor point, and registers the third care-of address in the home agent.

12. The communication method according to claim 7, wherein, when the communication terminal apparatus moves from a cell of the second mobility anchor point to a cell of the first mobility anchor point through one or more of the predetermined cells, the first mobility anchor point registers the first care-of address in the home agent while the communication terminal apparatus performs communication using the second care-of address in the one or more predetermined cells.

* * * * *